Feb. 25, 1964     P. ALBANI     3,121,995
AFTERBURNER SEAL
Filed March 5, 1962     2 Sheets-Sheet 1
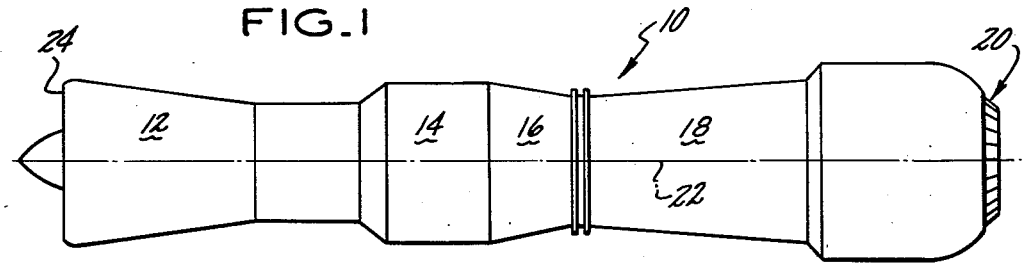
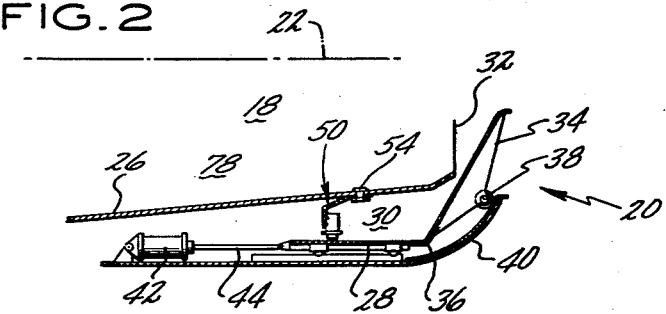
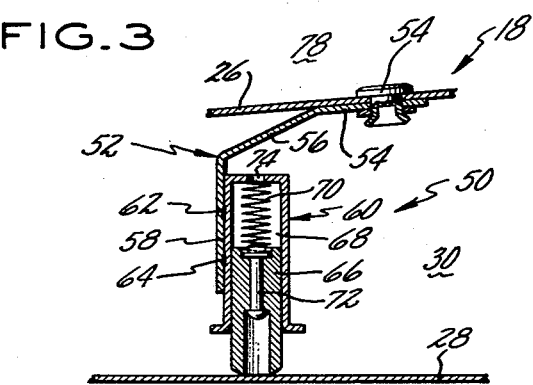
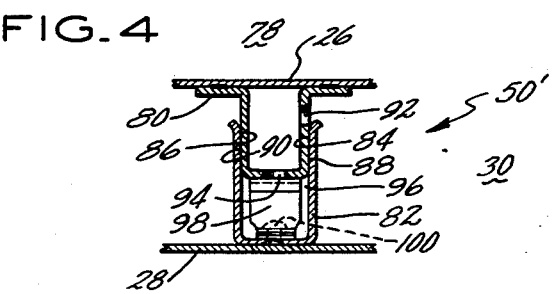
INVENTOR
PETER ALBANI
BY *Vernon F. Hauschild*
ATTORNEY

United States Patent Office 3,121,995
Patented Feb. 25, 1964

3,121,995
AFTERBURNER SEAL
Peter Albani, Tequesta, Fla., assignor to United Aircraft Corporation, East Hartford, Conn., a corporation of Delaware
Filed Mar. 5, 1962, Ser. No. 177,553
5 Claims. (Cl. 60—39.32)

This invention relates to apparatus for sealing between and positioning one duct which is enveloped by or enveloping a second duct and more particularly to sealing between an aircraft jet engine afterburner duct and the exhaust nozzle synchronizer duct or ring such that the synchronizer duct is positioned from the afterburner duct by the sealing means.

It is an object of this invention to provide sealing and support means between two concentric ducts so that one of the ducts will be supported from the other duct by the apparatus which also serves as a seal to prevent the escape of pressurized gas therebetween.

It is a further object of this invention to teach means to seal between and support an exhaust nozzle synchronizer duct from the afterburner duct which means permits axial, radial and circumferential relative movement between the two ducts.

It is a further object to teach such sealing and support means wherein said ducts are maintained in concentric relation by the combined action of springs and the force of the pressurized gas being sealed.

Other objects and advantages will be apparent from the specification and claims and from the accompanying drawings which illustrate an embodiment of the invention.

FIGURE 1 is an external side view showing of an aircraft turbojet engine with afterburner and exhaust nozzle.

FIGURE 2 is an enlarged cross-sectional showing of a portion of the afterburner and exhaust nozzle to illustrate my sealing and support means.

FIGURE 3 is an enlarged cross-sectional view of a preferred embodiment of my sealing and support means extending between an afterburner duct and an exhaust nozzle synchronizer duct.

FIGURE 4 is a view similar to FIGURE 3 showing an alternate embodiment of my invention.

Figure 5:
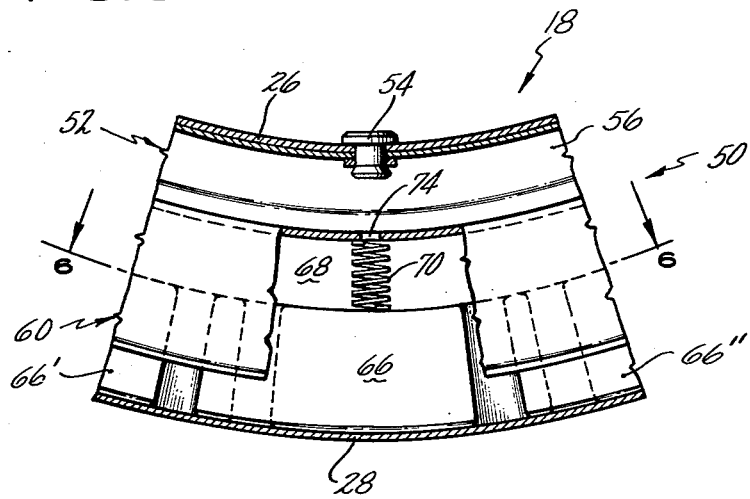
FIG. 5 is an elevation looking from the right of FIG. 3.

Referring to FIG. 1 we see modern turbojet aircraft engine 10 which consists of compressor section 12, burner section 14, turbine section 16, afterburner section 18 and exhaust nozzle 20. Engine 10 is preferably of circular cross section and concentric about axis 22. In operation, air enters compressor inlet 24, is compressed in passing through compressor section 12, has heat added thereto in passing through burner section 14, has energy extracted therefrom to drive compressor section 12 in passing through turbine section 16, and then is reheated in afterburner section 18 before being discharged to atmosphere to generate thrust through exhaust nozzle 20. Engine 10 is of the conventional type described in greater particularity in U.S. Patent Nos. 2,711,631 and 2,747,367, to which reference is hereby made.

Referring to FIG. 2 we see my invention in greater particularity and note that it includes afterburner duct 26 and synchronizer duct or ring 28, each of which are preferably of circular cross section and concentric about axis 22 to define annular passage 30 therebetween. Afterburner duct 26 culminates in primary exhaust gas outlet 32. A plurality of circumferentially positioned and preferably overlapping flaps 34 are pivotally attached at 36 to the after or downstream end of synchronizer duct 28. While not necessarily so limited, each flap 34 has a roller 38 thereon which co-acts with cam 40 as synchronizer duct 28 is caused to reciprocate axially by actuating means 42, to cause flaps 34 to move inwardly and outwardly with respect to axis 22 thereby varying the outlet area of exhaust nozzle 20. Actuating means 42 may be of conventional type comprising a plurality of hydraulic or pneumatic pistons each operating within one of a plurality of circumferentially positioned cylinders and having connecting rod 44 projecting therefrom and attaching to synchronizer duct 28 to cause synchronizer duct 28 and hence flaps 34 to move in unison as the pistons move axially within cylinders 42. My sealing and support means 50 is shown in FIGURE 2 attached to afterburner duct 26 and extending between afterburner duct 26 and synchronizer duct or ring 28.

Due to the fact that afterburner duct 26 is subjected to extremely hot temperatures due to the combustion which takes place therein, while cooling air flows over synchronizer duct 28 and its related parts, it will be necessary to permit axial, radial and circumferential movement between afterburner 26 and synchronizer duct 28. In addition to the afterburner and exhaust nozzle embodiment shown in slight detail in FIG. 2, afterburner 18 and exhaust nozzle 20 may be of the type taught in U.S. Patent Nos. 2,934,890; 2,846,842 and 2,846,841, to which reference is hereby made.

Referring to FIGURE 3 we see an enlarged cross-sectional showing of my supporting and sealing means 50 positioned between afterburner duct 26 and synchronizer duct 28. Apparatus 50 includes ring 52 which includes a substantially cylindrical section 54 which snugly engages the outer periphery of afterburner duct 26 and is attached thereto by any convenient means such as rivets 54. Ring 52 also includes frusto-conical plate section 56 and radially extending circumferential plate 58 which is joined to section 54 by section 56. Ring 52 is solid so that the pressurized engine gases which pass through afterburner 18 and may enter annular passage 30 therefrom will not pass forwardly therethrough. Apparatus 50 further includes radially outwardly opening U-shaped ring member 60, which is preferably a continuous ring and sealably attached to section 58 of plate 52 by any convenient means such as welds 62 and 64.

Figure 6:
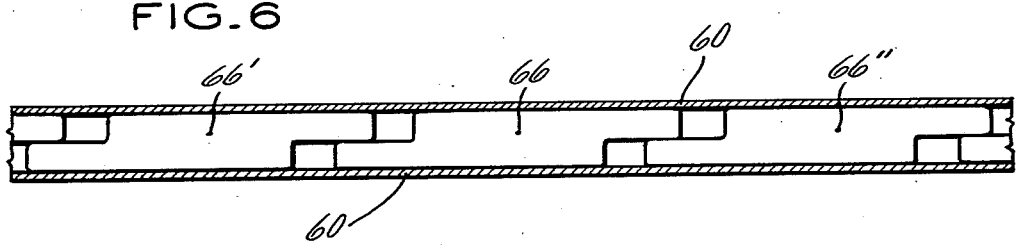
FIGURE 6 is a view taken along line 6—6 of FIGURE 5.

It will be noted that in this fashion U-shaped ring 60 is supported from afterburner duct 26 by plate member 52 and extends radially outwardly from plate 52 into annular passage 30 toward and close to synchronizer ring or duct 28 but terminates radially short thereof. Segmented seal ring 66, which may well be of carbon or Hastelloy (AMS 5754) (see Aerospace Material Specification 5754, Society of Automotive Engineers, Inc., 485 Lexington Avenue, New York 17, New York, or Hastelloy X Bulletin, Stellite Division, Union Carbide Corporation, Kokomo, Indiana or American Society of Metals, Metals Handbook, volume 1, 8th edition, page 467) construction and comprising a plurality of circumferentially positioned and circumferentially overlapping segments co-acting to form a complete ring, is positioned in and projects radially outwardly from U-shaped ring 60. The circumferentially segmented and overlapping seal ring 66 is best pictured in FIGURES 5 and 6. In FIGURES 5 and 6 the overlapping circumferential segments are designated as 66, 66', and 66''. Segmented seal ring 66 is preferably ceramic coated to give it better temperature resistance and acceptable friction characteristics for sealing and support contact with the inner surface of synchronizer duct 28. Seal ring 66 is of such inner and outer diameter dimension that cavity 68 is formed between seal ring 66 and the inner surface of U-shaped ring 60 and a plurality of springs 70, which may be either of the leaf or coil type, are positioned therein and bear against seal 66 and ring 60 to force or bias sedmented seal ring 66 outwardly into sealing engagement or contact with the entire inner periphery of synchronizer duct 28. It may be found desirable to position spring 70 with respect to seal 60 by rivet or bolt members 72. To assist the action of spring 70, I further provide apertures 74 in ring 60 which places annular cavity 68 into communication with the high pressure exhaust gas passage 78 within afterburner 18 through annular passage 30. This pressurization of cavity 68 will aid spring 70 in forcing segmenting seal 66 radially outward and into contact with synchronizer duct 28.

In this fashion, since apparatus 50 is solid in nature, and extends between ducts 26 and 28 it clearly forms a seal therebetween to prevent gas flow therebetween and the escape of pressurized gas from passage 78 therethrough. It will also be seen that with afterburner duct 26 supported in engine 10 in conventional fashion, the afterburner 26 will also serve to support synchronizer duct 28 by the action of apparatus 50.

It may be further desirable, if synchronizer duct 28 is of sufficient axial dimension, to use an additional support means spaced axially from my seal and support apparatus 50.

Referring to FIGURE 4 we see an alternate embodiment of my seal and support means extending between afterburner duct 26 and synchronizer duct or ring 28. In this embodiment U-shaped ring 80 and segmented U-shaped seal 82 are placed in piggy-back arrangement such that they extend between ducts 26 and 28 with ring 80 attached to duct 26 in sealing engagement and with ring 82 so attached to spring 98. U-shaped rings 80 and 82 are of selected axial dimension such that surfaces 84 and 86 of ring 82 are in sealing engagement with surfaces 88 and 90 of ring 80. Apertures 92 and 94 are placed in the walls of ring 80 to be in contact with pressurized passage 78 through annular passage 30 such that the pressurized gas therefrom may pass through apertures 92 and 94 into annular cavity 96 to force rings 80 and 82 apart radially and thereby seal between ducts 26 and 28 and support duct 26 from duct 28. Springs 98 are positioned in cavity 96 and may be of either leaf or coil type and serve to assist in radially separating rings 80 and 82. Rivets 100 may be used to perform the dual function of connecting spring 98 and ring 82. Segmented seal ring 82 is preferably ceramic coated to give it better temperature resistance and acceptable friction characteristics for sealing and support contact with the inner surface of synchronizer duct 28.

It will be obvious to those skilled in the art that in the FIGURE 4 construction, rings 80 and 82 could as well be opening in a radial outward direction as opposed to the radial inward direction illustrated. It will further be obvious that in both the FIGURE 3 and the FIGURE 4 construction, seal and support means 50 and 50¹ are equally as effective whether inner duct 26 is supported from outer duct 28 or outer duct 28 is supported from inner duct 26.

It is to be understood that the invention is not limited to the specific embodiments herein illustrated and described but may be used in other ways without departure from its spirit as defined by the following claims.

I claim:
1. In an aircraft jet engine afterburner having an axis:
an afterburner duct of circular cross-section supported concentrically about said axis,
a synchronizer duct enveloping said afterburner duct to form a first passage therebetween,
said afterburner duct forming a high pressure gas passage communicating with said first passage,
and sealing and support means extending between said ducts to block flow from said high pressure gas passage through said first passage including:
first means sealably engaging said afterburner duct and extending therefrom into said first passage and including a radially outwardly open ring of U-shaped cross-section,
and second means sealably engaging said first means and including a radially movable and biased, flexible, circumferentially segmented seal ring including circumferentially overlapping segments positioned in and extending radially outwardly from said U-shaped ring and urged radially outwardly to sealably contact the entire periphery of said synchronizer duct exposed to said first passage and support said synchronizer duct from said afterburner duct while permitting relative motion therebetween.

2. Apparatus according to claim 1 wherein springs are positioned between said U-shaped ring and said seal segments to urge said seal segments radially outwardly and also wherein said U-shaped ring includes apertures communicating with said gas passage through said first passage to permit the entry of pressurized gas from said gas passage between said U-shaped ring and said seal segments to assist said springs.

3. Apparatus according to claim 1 and including a variable area exhaust nozzle positioned to establish a variable area outlet downstream of said afterburner duct, means including said synchronizer duct to vary the area of said exhaust nozzle.

4. In a flight apparatus having an axis:
relatively movable first and second ducts positioned to form a first passage therebetween,
said first duct forming a high pressure gas passage communicating with said first passage,
means to support one of said ducts,
and sealing and support means extending between said ducts to block flow from said high pressure gas passage through said first passage including:
first means sealably engaging said supported duct and extending therefrom into said first passage,
and second means sealably engaging said first means and including radially movable and biased flexible means in the form of a circumferentially segmented seal ring urged radially to sealably contact the entire periphery of the other of said ducts exposed to said first passage to seal said first passage and support the other of said ducts from said supported duct while permitting relative motion therebetween.

5. In an aircraft jet engine afterburner having an axis:
an afterburner duct of circular cross-section supported concentrically about said axis,
a synchronizer duct enveloping said afterburner duct to form a first passage therebetween,
said afterburner duct forming a high pressure gas passage communicating with said first passage,
and sealing and support means extending between said ducts to block flow from said high pressure gas passage through said first passage including:
first means sealably engaging one of said ducts and extending therefrom into said passage comprising a first ring of U-shaped cross-section attached to the entire circumferential periphery of said one duct,
and second means sealably engaging said first means comprising a second ring of U-shaped cross-section sealably engaging said first ring and being circumferentially segmented and positioned in radially overlapping piggy-back relation to said first ring, and spring means positioned between said rings and urging said rings apart radially so that said segmented ring sealably contacts the entire circumferential periphery of the other of said ducts to support said other of said ducts from said one duct while permitting relative motion therebetween.

References Cited in the file of this patent

UNITED STATES PATENTS

| | | |
|---|---|---|
| 1,324,775 | Anathor | Dec. 16, 1919 |
| 2,722,801 | Lombard | Nov. 8, 1955 |
| 2,831,321 | Laucher | Apr. 22, 1958 |
| 2,940,692 | Kerry | June 14, 1960 |
| 3,044,258 | Carlton | July 17, 1962 |
| 3,050,937 | James | Aug. 28, 1962 |
| 3,062,003 | Hamilton | Nov. 6, 1962 |